US012626059B2

(12) United States Patent　　　(10) Patent No.:　US 12,626,059 B2
Minoura et al.　　　　　　　　　　(45) Date of Patent:　May 12, 2026

(54) INFORMATION PROCESSING APPARATUS, RECORDING MEDIUM AND INFORMATION PROCESSING METHOD

(71) Applicant: DAI NIPPON PRINTING CO., LTD., Tokyo (JP)

(72) Inventors: Katsuhiko Minoura, Tokyo (JP); Motoki Horita, Tokyo (JP); Takeshi Moriya, Tokyo (JP); Chigusa Hotta, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 266 days.

(21) Appl. No.: 18/606,600

(22) Filed: Mar. 15, 2024

(65) Prior Publication Data

US 2025/0086384 A1　　Mar. 13, 2025

(30) Foreign Application Priority Data

Sep. 8, 2023　(JP) ................................. 2023-146454

(51) Int. Cl.
*G06F 40/106*　　　(2020.01)
*G06F 40/169*　　　(2020.01)
*G06F 40/194*　　　(2020.01)
*G06F 40/174*　　　(2020.01)

(52) U.S. Cl.
CPC .......... *G06F 40/194* (2020.01); *G06F 40/106* (2020.01); *G06F 40/169* (2020.01); *G06F 40/174* (2020.01)

(58) Field of Classification Search
CPC .... G06F 40/194; G06F 40/106; G06F 40/169; G06F 40/174
See application file for complete search history.

(56) References Cited

U.S. PATENT DOCUMENTS

| | | | | |
|---|---|---|---|---|
| 2007/0214120 | A1* | 9/2007 | Niendorff | .............. G06Q 50/16 |
| 2014/0093858 | A1* | 4/2014 | Caruthers, Jr. | .......... G09B 7/02 |
| | | | | 434/362 |
| 2014/0258825 | A1* | 9/2014 | Ghosh | .................... G06V 30/40 |
| | | | | 715/222 |

FOREIGN PATENT DOCUMENTS

| | | |
|---|---|---|
| JP | 2017-146842 A | 8/2017 |
| JP | 2017-146844 A | 8/2017 |
| JP | 2017-146845 A | 8/2017 |

OTHER PUBLICATIONS

JP2017146845A (ENG Translation), "Financing Document Management System and Method" by Meguro et al. Published on Aug. 24, 2017 (Year: 2017).*

* cited by examiner

*Primary Examiner* — Rinna Yi
(74) *Attorney, Agent, or Firm* — Oliff PLC

(57)　　　　ABSTRACT

An information processing apparatus including a control unit, and the control unit acquires text data of a plurality of documents to be examined; outputs a list of pieces of information of the plurality of documents to be examined in a first display area of a display screen; if accepting selection of a piece of the information, outputs an image of at least one of the plurality of documents to be examined corresponding to a selected piece of the information, to a second display area of the display screen; outputs an examination result concerning examination items of the plurality of documents to be examined to a third display area of the display screen; and outputs a question related to examination to a fourth display area of the display screen.

9 Claims, 18 Drawing Sheets

FIG.4

List of Application

Logout

| Application Number | Application Category | Application Name | Application Date | Electronic Examination Conducted Date | Status | Application File Name |
|---|---|---|---|---|---|---|
| | | | | | | |
| | | | | | | |
| | | | | | | |
| | | | | | | |

| 1 | 2 | 3 |
|---|---|---|

FIG.5

Application Details                                                                    ( Logout )

| Application Number | 12345 |
| --- | --- |
| Application Category | ○○○○ |
| Application Name | × × × × |
| Application Date | ○ year ○ month ○ day ○ hour ○ minutes |
| Electronic Examination Conducted Date | |
| Status | Waiting for Examination |
| Application File Name | Application Form |

( Examination )          ( Circulate )

FIG.6

Application for Use of Childcare Facilities

Application Name : Application for Use of Childcare Facilities 2023×××× _01
Application Date : 2023／6／1

| Guardian | Address | |
| | Name | |
| | Telephone Number | |

| Period of Childcare Request | |
| Time of Childcare Request | |

| Classification | Name | Sex | Age | Date of Birth |
| --- | --- | --- | --- | --- |
| Child Pertaining to The Application | | | | |
| Household Members | | | | |
| | | | | |
| | | | | |
| | | | | |

| Reason for The Need for Childcare | |

FIG.9

| No. | Item | Value | Judgment | Alert | Comment |
|-----|------|-------|----------|-------|---------|
| 1 | Insured Number | ○○○○ | OK | | |
| 2 | Insurer Number | × × × × | OK | | |
| 3 | Individual Number | △△△△ | OK | | |
| 4 | Name (Chinese Character) | ○×○× | OK | | |
| 5 | Name (Pronunciation Guide) | × × △△ | OK | | |
| 6 | Sex | ○○ | OK | | |
| 7 | Date of Birth | ○ year ○ month ○ day | NG | It is different from information from core computer system | |

Different display manner

FIG.10

| No. | Question 1 | Answer | Question 2 | Judgment |
|---|---|---|---|---|
| 1 | Does xxx match xxx of xxx | — | | OK NG |
| 2 | Is there xxx in xxx | — | | OK NG |
| 3 | Is xxx written in xxx | — | | OK NG |
| 4 | Is there no error in xxx | Yes No | | OK NG |
| 5 | Does xxx match xxx of xxx | Yes No | | OK NG |
| 6 | Is there xxx in xxx | Yes No | | OK NG |
| 7 | Is xxx written in xxx | — | | OK NG |
| 8 | Is there no error in xxx | — | | OK NG |
| ... | ... | ... | ... | ... |

FIG.11

| No. | Question 1 | Answer | Question 2 | Judgment |
|---|---|---|---|---|
| 1 | Does xxx match xxx of xxx | — | | OK NG |
| 2 | Is there xxx in xxx | — | | OK NG |
| 3 | Is xxx written in xxx | — | | OK NG |
| 4 | Is there no error in xxx | Yes No | | OK NG |
| 5 | Does xxx match xxx of xxx | Yes No | | OK NG |
| 6—1 | Is the applicant 18 years or older | Yes No | Please confirm that the applicant is 18 years or older | OK NG |
| 6—2 | | | Please confirm that the parental consent form is attached | OK NG |
| 7 | Is xxx written in xxx | — | | OK NG |
| 8 | Is there no error in xxx | — | | OK NG |
| . . . | . . . | . . . | . . . | . . . |

FIG.12

| Reference Information |
| --- |
| × × × × × : Present |
| × × × × × : Absent |
| × × × × × : Present |
| × × × × × : Absent |
| × × × × × : × × × × × Yen |

FIG.13

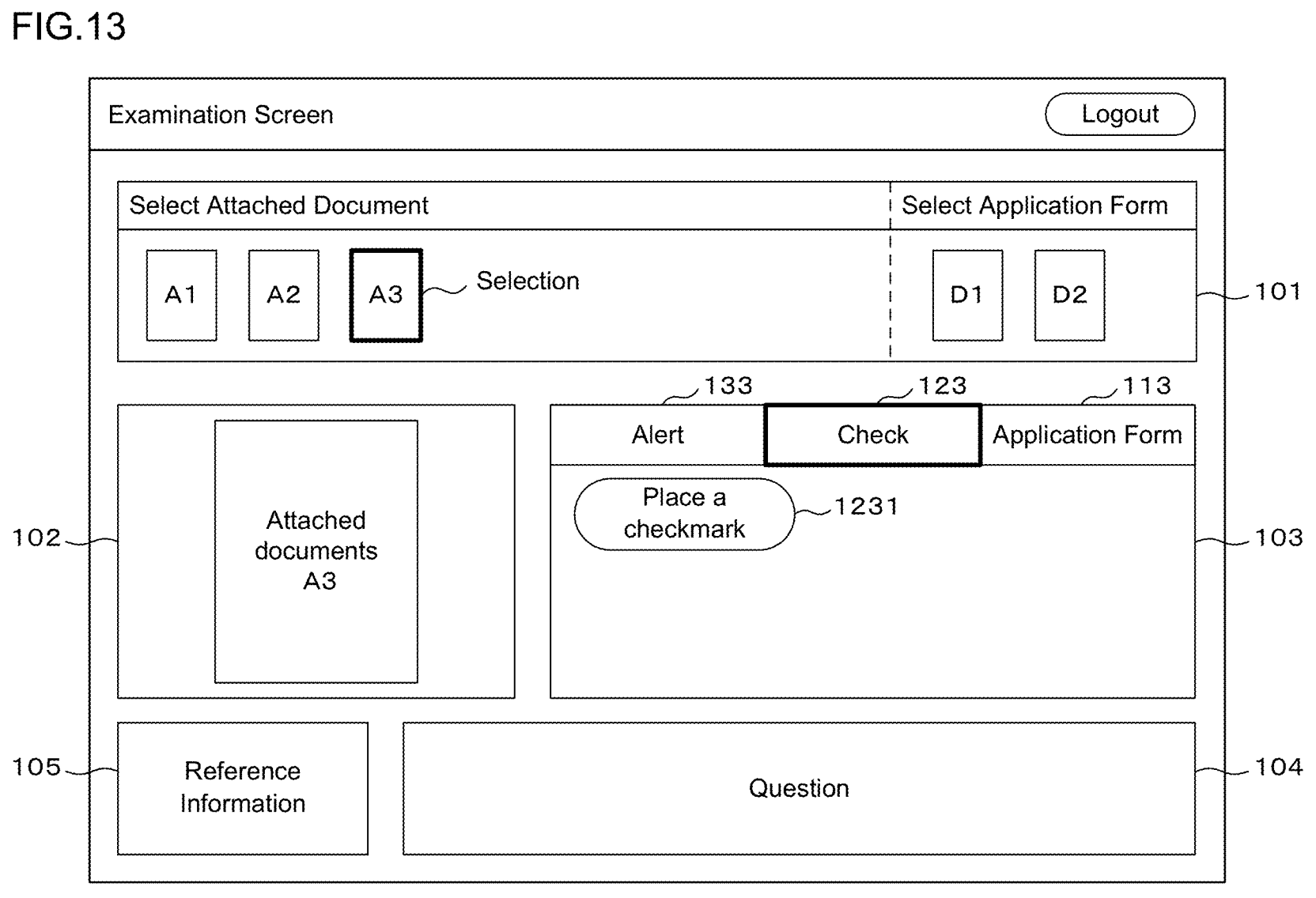

Examination Screen

Logout

Select Application Form — 101

D1    D2

Application Form — 103

113

Check — 123

Alert — 133

Place a checkmark — 1231

Select Attached Document

Selection

A1    A2    A3

Attached documents A3 — 102

Question — 104

Reference Information — 105

FIG.16

Question Setting Screen                                                                Logout

| Application Category | x x x Application |
| --- | --- |

| Question | No. | Question 1 | Conditional Branch | Answer to Question 1 | Question 2 | |
| --- | --- | --- | --- | --- | --- | --- |
| | 1 | Please confirm that there are no omissions in the application form | Absent | | | ⊟ |
| | 2 | Please confirm that personal identification documents are attached | Absent | | | ⊟ |
| | 3 | Is the applicant 18 years or older | Present | Yes | Please confirm that the applicant is 18 years or older | ⊞ ⊟ |
| | | | | No | Please confirm that the parental consent form is attached | ⊞ ⊟ |
| | ... | ... | ... | ... | ... | |

FIG.17

Examination Rule Setting Screen

Logout

Application Category: × × × Application

Examination Rule

| No. | Attached Documents / Administrative Core Computer System | Examination Item | Examination Type | Examination Requirements | | |
|---|---|---|---|---|---|---|
| 1 | Attached Documents A1 | Name | Match an Application Form | ─ | − | + |
| 2 | Attached Documents A2 | Age | Meet a Condition | 18 Larger | − | + |
| 3 | × × System ○○ Information | Individual Number | Match an Application Form | ─ | − | + |
| ... | ... | ... | ... | | | |

INFORMATION PROCESSING APPARATUS, RECORDING MEDIUM AND INFORMATION PROCESSING METHOD

REFERENCE TO RELATED APPLICATIONS

This application claims priority from Japanese Patent Application No. 2023-146454 filed on Sep. 8, 2023. The entire content of the priority application is incorporated herein by reference.

BACKGROUND ART

Business operations of financial institutions and procedures of administrative agencies include the work of examining the contents of various types of documents.

Japanese Patent Application Laid-Open No. 2017-146842 discloses a system that converts various documents such as contracts, solicitation documents, approval requests and contact forms into electronic data to reduce time for paperwork.

The examination of documents, however, involves not only comparison between the content of one document and that of another document (one-to-one relationship) but also comparison between the content of one document and the contents of multiple documents (one-to-many relationship), which creates a demand for streamlining of paperwork for examining a large volume of documents.

SUMMARY

It is an object of the present disclosure, in view of these circumstances, to provide an information processing apparatus, a recording medium and an information processing method that can streamline the examination work of documents.

The present application incudes multiple means for solving the problems described above. As one example thereof, an information processing apparatus comprises a control unit, and the control unit acquires text data of a plurality of documents to be examined, outputs a list of pieces of information of the plurality of documents to be examined in a first display area of a display screen, and if accepting selection of a piece of the information, outputs an image of at least one of the plurality of documents to be examined corresponding to a selected piece of the information, to a second display area of the display screen, outputs an examination result concerning examination items of the plurality of documents to be examined to a third display area of the display screen, and outputs a question related to examination to a fourth display area of the display screen.

According to the present disclosure, it is possible to streamline the examination work of documents.

BRIEF DESCRIPTION OF DRAWINGS

FIG. 4 illustrates one example of an application list.

FIG. 5 illustrates one example of application details.

FIG. 6 illustrates one example of an application form for the use of childcare facilities as an application category.

FIG. 9 illustrates one example of an examination result displayed in a third display area.

FIG. 10 illustrates a first example of display of questions.

FIG. 11 illustrates a second example of display of questions.

FIG. 12 illustrates an example of reference information.

FIG. 13 illustrates a second example of the examination screen.

FIG. 16 illustrates one example of a question setting screen.

FIG. 17 illustrates one example of an examination rule setting screen.

DESCRIPTION

The embodiment of the present disclosure will be described below with reference to the drawings.

Figure 1:
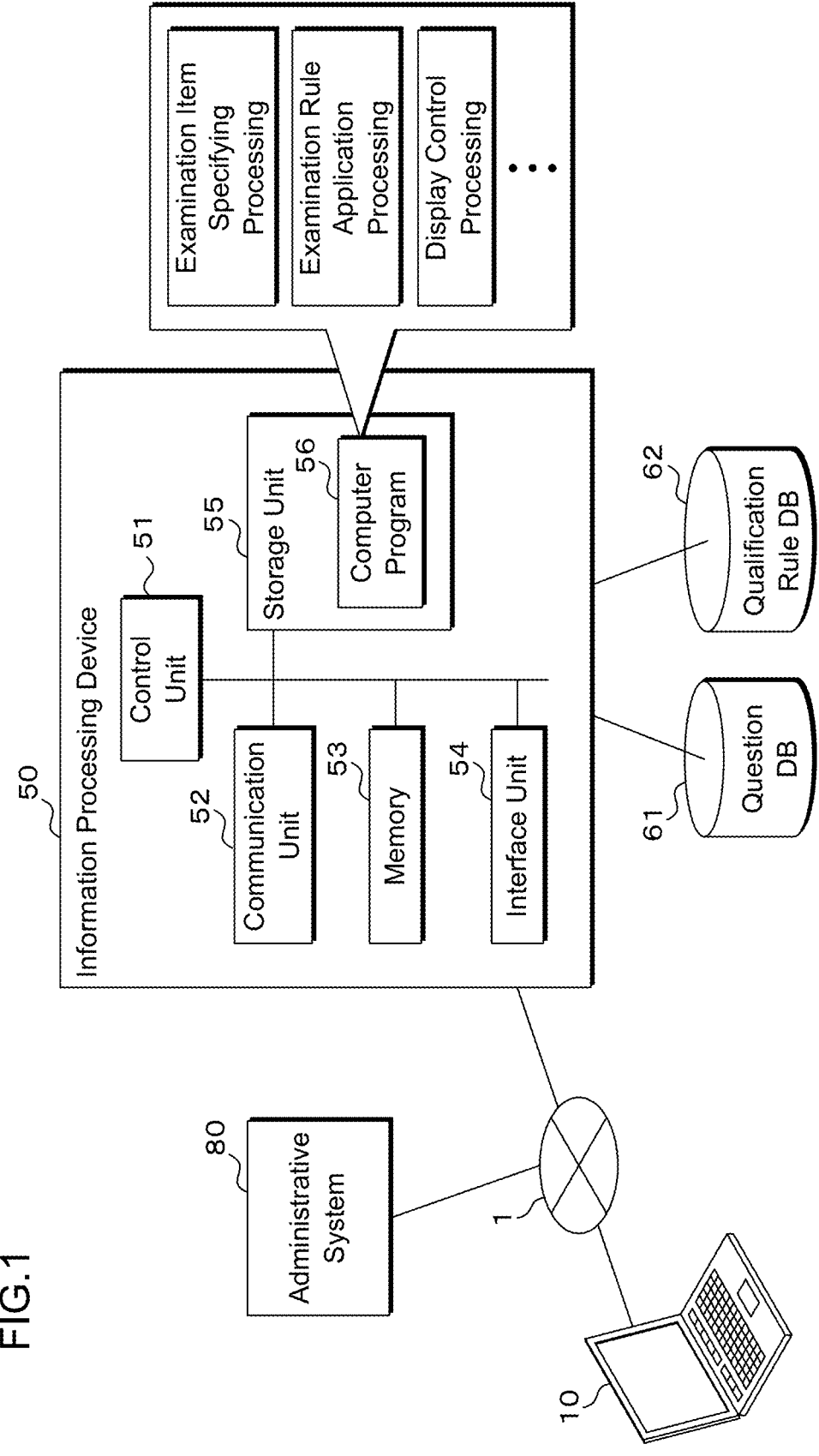
FIG. 1 illustrates one example of an information processing system according to the present embodiment.

FIG. 1 illustrates one example of an information processing system according to the present embodiment. The information processing system includes an information processing apparatus 50 and a terminal device 10 that is connected to the information processing apparatus 50 through a communication network 1. The information processing system may include, for example, a core computer system for an administrative agency or the like and an administrative core computer system 80 as an external system, such as systems used in the associated agencies and industries. The administrative core computer system 80 is also referred to as an "administrative system" and may be composed of one or more servers. The administrative core computer system 80 is connected to the information processing apparatus 50 through the communication network 1. The information processing apparatus 50 can gain access to a question DB 61 and an examination rule DB 62. Note that the question DB 61 and the examination rule DB 62 may be incorporated into the information processing apparatus 50 (e.g., the storage unit 55). The terminal device 10 may employ, for example, a personal computer, a tablet terminal, a smartphone or the like and is used by the user who is in charge of examining documents. The user includes, for example, an official worker of an administrative agency (e.g., municipal office) and the parties concerned. The user is herein assumed to be the person who is in charge of the examination.

The information processing apparatus 50 includes a control unit 51 that controls the entire device, a communication unit 52, a memory 53, an interface unit 54 and a storage unit 55. The storage unit 55 can be composed of, for example, a hard disk or a semiconductor memory, and stores a computer program 56 (program product) and necessary information. The computer program 56 may be downloaded from an external device via the communication unit 52 and stored in the storage unit 55. In addition, the computer program 56 recorded on a recording medium (e.g., optically readable disc storage medium such as CD-ROM) may be read by a recording medium reader and stored in the storage unit 55. The information processing apparatus 50 may be configured to share the function among multiple information processing apparatuses.

The control unit 51 is configured to be incorporated with a necessary number of CPUs (Central Processing Units), MPUs (Micro-Processing Units) and GPUs (Graphics Processing Units). The control unit 51 can perform the processing defined by the computer program 56. That is, the processing by the control unit 51 is also processing by the computer program 56. The computer program 56 can perform processing such as an examination item specifying processing, examination rule application processing and display control processing (output control processing).

The computer program 56 can be deployed to be executed on a single computer or on multiple computers interconnected by a communication network.

The communication unit 52 includes a communication module and can send and receive necessary information to and from the terminal device 10 and the administrative core computer system 80 through the communication network 1.

The memory 53 may employ a semiconductor memory such as a Static Random Access Memory (SRAM), a Dynamic Random Access Memory (DRAM), a flash memory or the like. The computer program 56 can be deployed on the memory 53 so that the control unit 51 can execute the computer program 56.

The interface unit 54 realizes an interface function between the question DB 61 and the examination rule DB 62.

The information processing apparatus 50 acquires multiple documents to be examined from the terminal device 10 via the communication unit 52. The multiple documents to be examined are categorized into groups for each case, while documents to be examined for one case are brought together. In the case of work at administrative agencies such as a local government, documents to be examined correspond to documents necessary for procedures related to child-rearing, nursing care, support for disaster victims, car ownership and the like that are to be handled by local government, and mainly include an application form and multiple attached documents. The information processing apparatus 50 performs predetermined processing on the acquired documents to be examined and outputs the results of the examination. The examination results may be output to the terminal device 10, for example.

In the procedures by the administrative agency, the content of one document needs to be compared with that of other several documents for examination. For example, such documents include an application form for a procedure and multiple attached documents that are to be submitted together with the application form. There are two types of application forms for the procedure including an electronic application form (text data) that can be applied with a personal computer and an application form by handwriting. The handwriting application form is prepared at the counter of each local government and is to be filled in by hand by the applicant. The handwriting application form also includes an application form, having mailed by each local government, filled in by hand and applied by the applicant. The handwriting application form is OCR-processed and treated as text data. The attached documents include, for example, photographs, power of attorney, receipts and quotes. The attached documents further include a copy of a driver's license, a copy of a health insurance card and a copy of a certificate of residence. Comparison in the examination of a document is described below.

Figure 2:
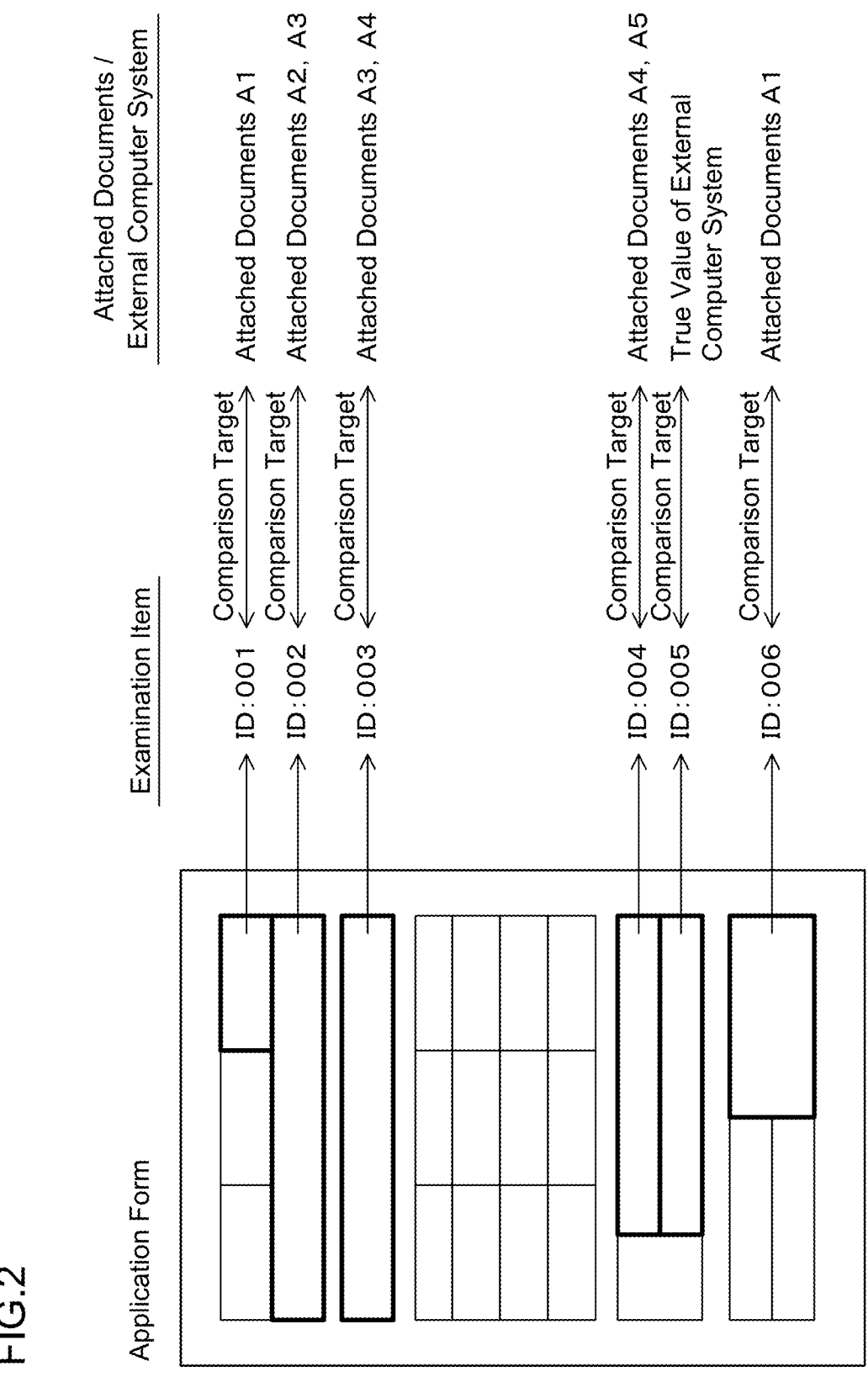
FIG. 2 illustrates one example of comparison for multiple documents.

FIG. 2 illustrates one example of comparison for multiple documents. As examples of the multiple documents to be examined, an application form and documents attached to the application form are herein described. Both of the electronic application form and handwriting application form are treated as data converted into the text form. Attached documents are treated as image data read by OCR or the like. The information processing apparatus compares an application form and attached documents based on the obtained text data of the application form and the image data of the attached documents linked to the application form, to perform examination processing. In the example illustrated in FIG. 2, the application form contains six examination items with examination item ID 001 to ID 006. The examination item with the examination item ID 001 is examined in comparison with the attached document A1. The examination item with the examination item ID 002 is examined in comparison with the attached documents A2, A3. The examination item with the examination item ID 003 is examined in comparison with the attached documents A3 and A4. The examination item with the examination item ID 004 is examined in comparison with the attached documents A4 and A5. The examination item with the examination item ID 005 is examined in comparison with the information (true value) from the administrative core computer system. The examination item with the examination item ID 006 is examined in comparison with the attached document A1. For each examination item, the user sets in advance the location and details of information to be read and compared relative to a designated area (frame). If the date of birth has been entered in the application form, for example, whether or not the application form is correct with reference to the personal information of the applicant obtained from the administrative core computer system. The examination for the examination items is conducted by comparing the contents of the examination items set by the user in advance with the attached documents, and the examination result related to the examination items are displayed as described below (see FIG. 7). Note that the comparison illustrated in FIG. 2 is a mere example, schematically depicting the need for examination by comparing a single application form with multiple attached documents or information stored in the administrative core computer system.

Figure 3:
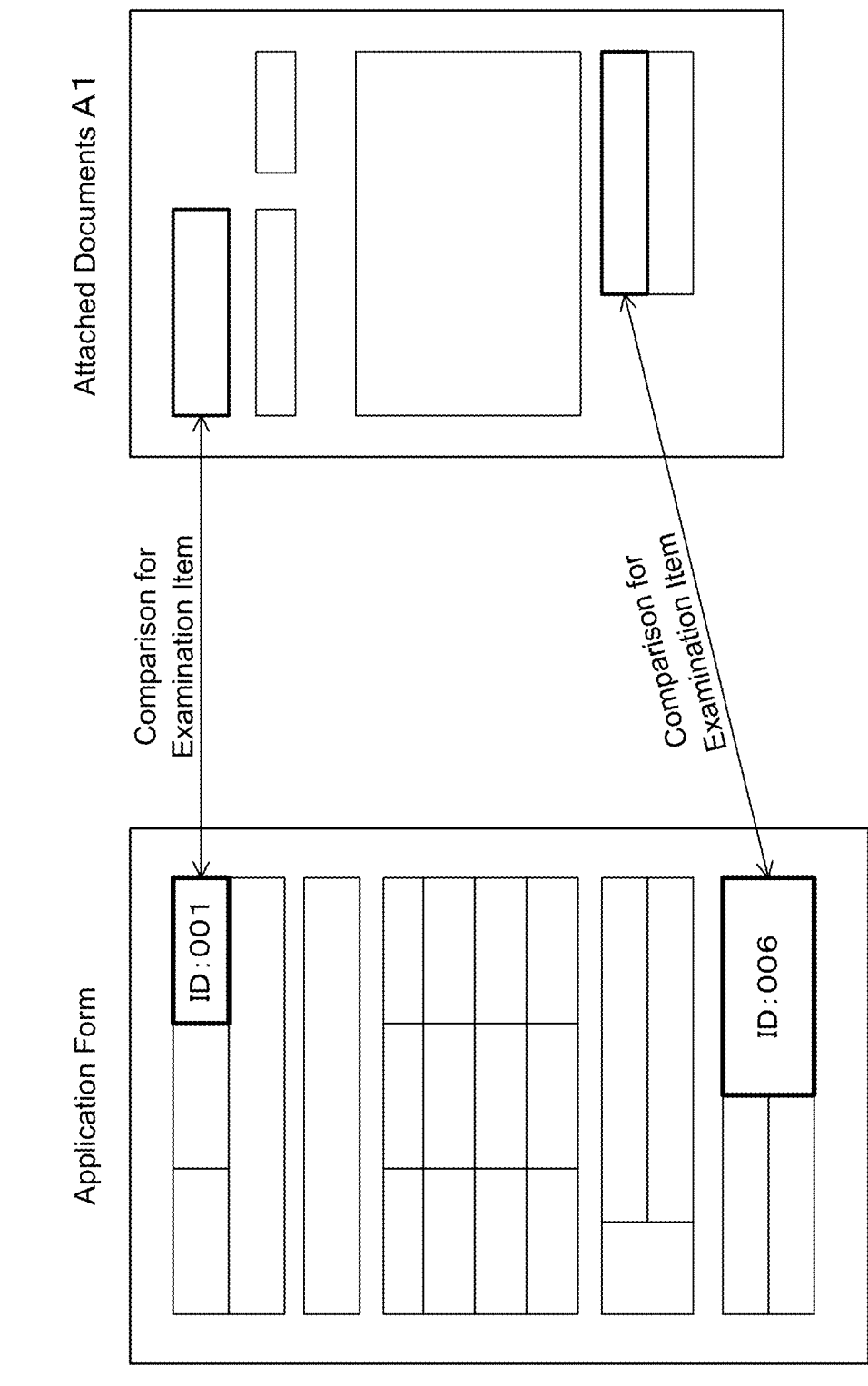
FIG. 3 illustrates one example of comparisons for examination items.

FIG. 3 illustrates one example of comparisons for examination items. FIG. 3 illustrates items to be compared in the case where the application form is compared with the attached document A1. In the example in FIG. 3, the examination items with ID 001 and ID 006 in the application form are compared with the corresponding examination items in the attached document A1. The examination items are capable of specifying areas desired to be examined in the application form and the attached document. The area to be examined is defined, for example, by a rectangular frame, which can be designated by the upper-left position (coordinates) of the frame as well as the vertical and horizontal dimensions of the frame. The examination item can be designated for each application form and each attached document. In other words, examination items vary depending on the application forms and the attached document.

The examination items contain information such as the insured number, the individual number, name, sex and date of birth of the insured, for example. For example, the location where the name has been entered vary for each application form. In other words, application forms having the same contents may have layouts different from one another. As illustrated in FIG. 2 or FIG. 3, it is thus necessary to set which one of the attached documents as well as which part thereof is to be compared with the application form. The correspondences for comparisons as illustrated in FIGS. 2 and 3 can be set in advance for each application form and stored in the storage unit 55.

Next, the display on the display screen (output to the display screen) of the terminal device 10 for examination by the information processing apparatus 50 (control unit 51) is described. The display screen for examination is displayed on the display panel of the terminal device 10 or the like for use when the user examines the documents to be examined.

FIG. 4 illustrates one example of a list of applications. The list of applications in FIG. 4 is displayed when the user logs in by entering the ID and password. As illustrated in FIG. 4, in the application list, the information on the application number, the application category, the application name, the application date, the electronic examination conducted date, the status and the application file name are displayed in association with one another. For example, the application category is application for use of childcare facilities, the application name is application for use of childcare facilities_2023XXXX-01, the application date is Jun. 1, 2023, and the electronic examination conducted date is Jun. 15, 2023, the status is "under examination," and the application file name is the file name of the application form. If the applications cannot be displayed on a single screen, page tabs are displayed, and, the application lists can be switched and displayed by selecting the tab of the desired page number. By selecting the desired application number, application details illustrated in FIG. 5 described below can be displayed.

FIG. 5 illustrates one example of the application details. The screen of the application details displays the details as to the application number, the application category, the application name, the application date, the electronic examination conducted date, the status and the application file name. In the electronic examination conducted date, the date when an examination by the information processing apparatus 50 is conducted is displayed. No date is displayed for the application number of the application that has not yet been examined. In the status, the status of an examination such as examination waiting, examination finished and the like is displayed. When an "examination" icon is operated, an examination screen exemplified in FIG. 6 descried later is displayed. When a "circulate" icon is operated, the application details that have been examined are circulated to an approver and shifted to the examination finished where the approval of the approver can be obtained. The approver is a person who approves the result of the examination when the person in charge finishes examining the application form for administrative services.

FIG. 6 illustrates one example of an application form for the use of childcare facilities as an application category. As illustrated in FIG. 6, the application name is "application for use of childcare facilities_2023XXXX-01," and the application date is Jun. 1, 2023. The application form for use of childcare facilities contains, for example, the address, name and telephone number of the guardian, the period and time of childcare request, the name, sex, age and date of birth of the child and the household members pertaining to the application and the reason for the need for childcare. The address, name and telephone number of the guardian, name, sex, age and date of birth of a child pertaining to the application, the reason for childcare and the like can be set as examination items.

Figure 7:
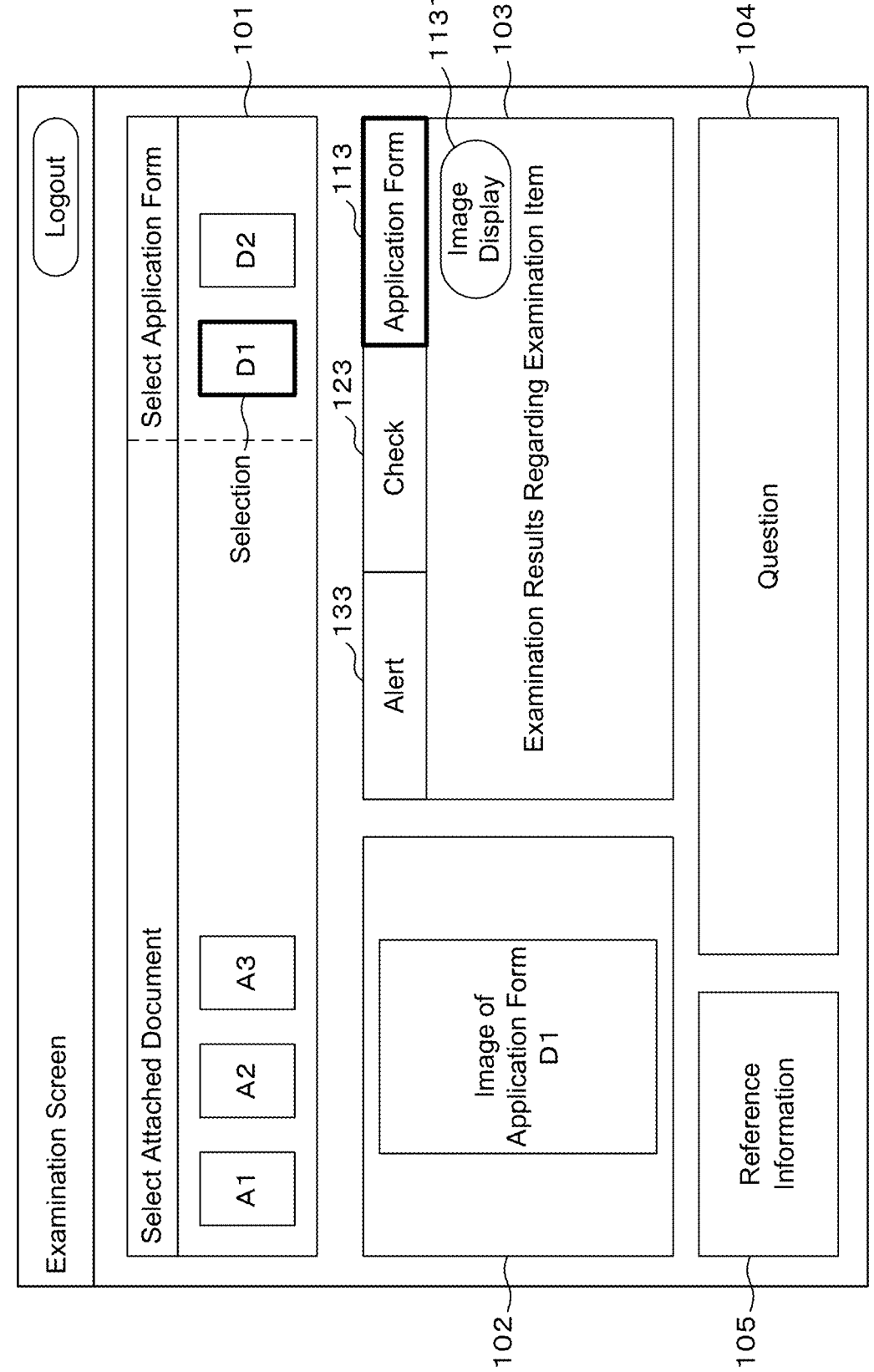
FIG. 7 illustrates a first example of an examination screen.

FIG. 7 illustrates a first example of an examination screen. The examination screen can be divided into five display areas of a first display area 101, a second display area 102, a third display area 103, a fourth display area 104 and a fifth display area 105. The positions and sizes of the display areas are mere examples and can be set appropriately. When acquiring the text data of multiple documents to be examined, the control unit 51 generates thumbnails of the respective documents based on the text data. The thumbnails are downsized images of the documents to be examined (application form and attached documents). The thumbnail here may be obtained from already-converted text data or from the image data which is character-recognized through OCR processing before converted into text data. The control unit 51 displays a list of thumbnails of the multiple documents to be examined in the first display area 101. In the example in FIG. 7, thumbnails being D1 and D2 of the application form and thumbnails A1, A2 and A3 of the attached documents are displayed at separate positions. This makes it easy to distinguish the application form from the attached documents. The reason for the thumbnails being D1, D2 for the single application form is that the application form consists of two pages, for example.

It is assumed that the user selects a single thumbnail (thumbnail D1 in FIG. 7). When accepting the selection of the thumbnail, the control unit 51 displays an image of the document to be examined corresponding to the selected thumbnail, in the second display area 102. In the example in FIG. 7, the image of the application form D1 corresponding to the thumbnail D1 is displayed. Note that, in the second display area 102, images of the attached documents A1, A2, A3 may also be displayed as well as the images of the application form D1, D2. That is, this area can display a thumbnail image of the selected application form and selected attached document.

As illustrated in FIGS. 2 and 3, the control unit 51 conducts examinations by comparing the examination items for multiple documents to be examined and displays the examination result in the third display area 103. The third display area 103 displays an "application form" tab 113, a "check" tab 123 and an "alert" tab 133. In the example of FIG. 7, the "application form" tab 113 is being selected. In the case of the example in FIG. 7, the control unit 51 compares examination items that are preset between the application form and the attached documents A1, A2, A3 and judges whether or not the examination items are met with the examination conditions stipulated according to a predetermined examination rule. The control unit 51 displays the examination result related to the examination items in the third display area 103. Here, an "image display" icon 1131 is displayed in the third display area 103.

Figure 8:
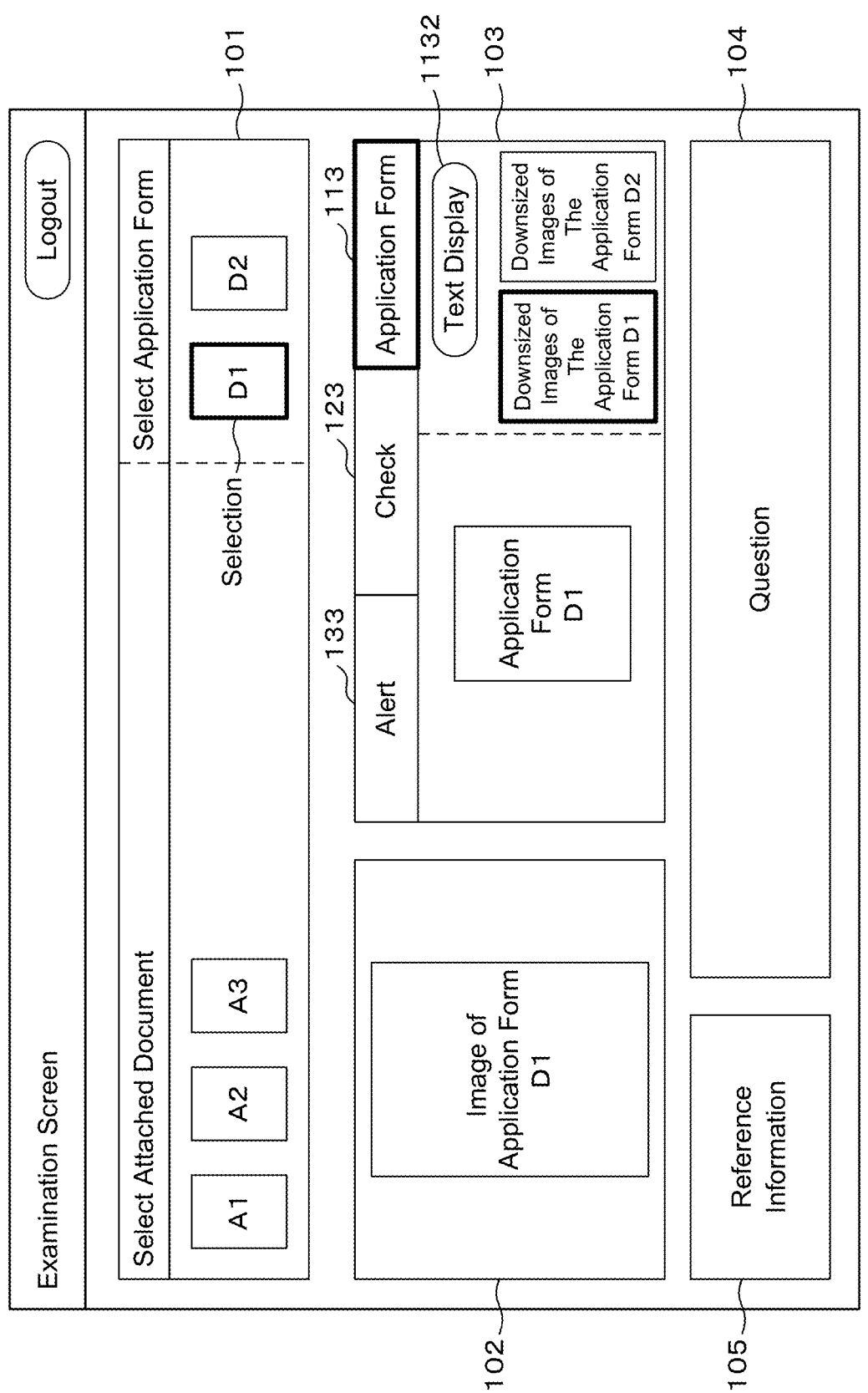
FIG. 8 illustrates a second example of the examination screen.

FIG. 8 illustrates a second example of the examination screen. When the user operates the "image display" icon 1131 in the first example of the examination screen illustrated in FIG. 7, the display is switched to an examination screen illustrated in FIG. 8. On the examination screen of the second example, downsized images of the application form D1, D2 are displayed in the third display area 103. When the user selects the downsized image of the application form D1, an enlarged image of the selected application form D1 is displayed on the left part. When the user operates a "text display" icon 1132 displayed in the third display area 103, the examination screen shown in FIG. 7 is displayed again.

FIG. 9 illustrates one example of an examination result displayed in the third display area 103. As illustrated in FIG. 9, the examination result is composed of an examination item (item column), a value column (true value: correct letter, numerical value and the like), a judgment column (OK or NG), an alert column and a comment column. In the example of FIG. 9, the result of examination obtained by comparing the application form with the attached documents is described as follows: For the "insured number," "OOOO" satisfies the examination requirements and is judged as OK. For "insurer number," "****" satisfies the examination requirements and is judged as OK. For "individual number," "ΔΔΔΔ" satisfies the examination requirements and is judged as OK. For "name (Chinese character; kanji in Japanese language), "O*O*" satisfies the examination requirements and is judged as OK. For "name (pronunciation guide; furigana in Japanese language), "ΔΔ" satisfies the examination requirements and is judged as OK. For "sex," "OO" satisfies the examination requirements and is judged as OK. On the other hand, for "date of birth," "oo year, oo moth,  date" does not satisfy (coincide with) the examination requirements and is thus judged as NG. The reason for being judged as NG (in the example of the drawing, "it is different from the information from the core computer system") is displayed in the alert column. The item judged as NG may be displayed in a different display manner (output in a different output manner) such as a bold frame for the "NG," a bold letter of "NG" and a background highlighting, for example, so that defective items of the application form and the attached document are made easily discernible. In the comment column, the user can enter a desired comment.

According to the configuration described above, the application form and the attached documents are displayed in an at-a-glance chart, so that the documents to be examined that are required for examination can easily be grasped. Moreover, by merely selecting a necessary thumbnail from the list of thumbnails of the documents to be examined, an image of the original document to be examined corresponding to the selected thumbnail is displayed, which eliminates the need for trouble of searching for a necessary document from multiple documents of paper media, thereby improving work efficiency. In addition, since the examination result of the documents is displayed along with the documents, the work of checking examination items and the work of collating with multiple documents (attached documents) can be digitized, thereby improving the efficiency of the work and streamlining the examination work of the documents.

The control unit 51 accepts an editing operation for the examination result displayed in the third display area 103. In FIG. 9, for example, the result displayed as "OK" in the judgment column may be modified as "NG," while the result displayed as "NG" in the judgment column may be modified as "OK." This makes it possible to add an exceptional judgment for the examination result as necessary.

As described above, the control unit 51 may change the display manner (output manner) of the examination item depending on the examination result for the examination item displayed in the third display area 103. This makes it possible to easily identify a deficient item in the application form and the attached documents.

As illustrated in FIG. 7, the control unit 51 displays questions related to the examination in the fourth display area 104. The questions need only be questions that call attention to examination points, and function as a checklist for the examination. Judgement of the questions in order allows the user to examine the documents for necessary points and prevents the user to fail confirmation after completing the judgement.

FIG. 10 illustrates a first example of display of questions. In the first example illustrated in FIG. 10, a first question column, an answer column and a judgment column are displayed. The question No. 1 for the first question, for example, is "Does x x x match x x x of x x x x x?" and there is no reference in the answer column. The user can thus judge the content of the question by operating the "OK" or "NG" icon in the judgment column. The same applies to the questions No. 2 and No. 3 for the first question.

The question No. 4 for the first question is "Is there no error in xxx?" When the user selects the "NO" icon out of the "YES" and "NO" icons, an additional icon is not displayed in the second question column. The user can judge the content of the question by operating the "OK" or "NG" icon in the judgment column. The same applies to the question No. 5 for the first question.

The question No. 6 for the first question is "Is there xxx in xxx?" When the user selects the "YES" icon out of the "YES" and "NO" icons in the answer column, an additional icon is displayed in the second question column as illustrated in FIG. 11 described later.

FIG. 11 illustrates a second example of display of questions. In the second example illustrated in FIG. 11, the "NO" icons in the answer column are being selected for the questions Nos. 4 and 5 of the first question as described above. One other hand, the "YES" icon is being selected in the answer column for the question No. 6 of the first question, and thus additional questions (question Nos. 6-1 and 6-2) are being displayed in a second question column. The user can judge each of the questions Nos. 6-1 and 6-2. In the example in FIG. 11, the first question is "Is the applicant 18 years or older." If the answer to the first question is "YES," "Please confirm that the applicant is 18 years or older on the identity verification document" is displayed as the second question. If the answer to the first question is "NO", "Please confirm that the parental consent form is attached" is displayed as the second question.

As described above, the control unit 51 may accept the answer to the primary question (first question) and display the secondary question (second question) depending on the accepted answer. Thus, the user only needs to judge "OK" or "NG" while focusing on the questions that are being displayed, and only needs to answer to the question with "YES" or "NO" if "YES" and NO" are displayed in the answer column. Then, if an additional second question is displayed depending on the answer, the user only needs to judge "OK" or "NG" for the second question additionally displayed. By making a judgment according to the display of the question, the examination points can be checked easily without omission. As described later, questions can be registered or changed by the user in advance.

As illustrated in FIG. 7, the control unit 51 displays reference information related to the questions in the fifth display area. The control unit 51 stores in the storage unit 55 reference information associated with procedures related to, for example, child-rearing, nursing care, disaster victim support and vehicle ownership that are to be handled by the local government, and may read, from the storage unit 55, and display the reference information corresponding to the procedure related to the document to be examined.

FIG. 12 illustrates an example of the reference information. The reference information varies depending on the procedure to which the documents to be examined are related. As illustrated in FIG. 12, the reference information includes "x x x x x: present," "x x x x x x: absent" and "x x x x x x: x x x x x yen" for example. The reference information is information compiled so as to be confirmed, including information that needs to be searched by logging into the core computer system and the information that needs to be searched for the ledger filed in the administrative agency when the user examines the document to be examined. This eliminates the need for the user to individually look into the core computer system or the ledger, improving operational efficiency and streamlining examination work of documents.

In addition, the control unit 51 may accept insertion of at least one of a predetermined symbol and a comment into the image of the document to be examined that is being displayed in the second display area 102. The method of inserting a predetermined symbol and a comment is described below.

Figure 14:
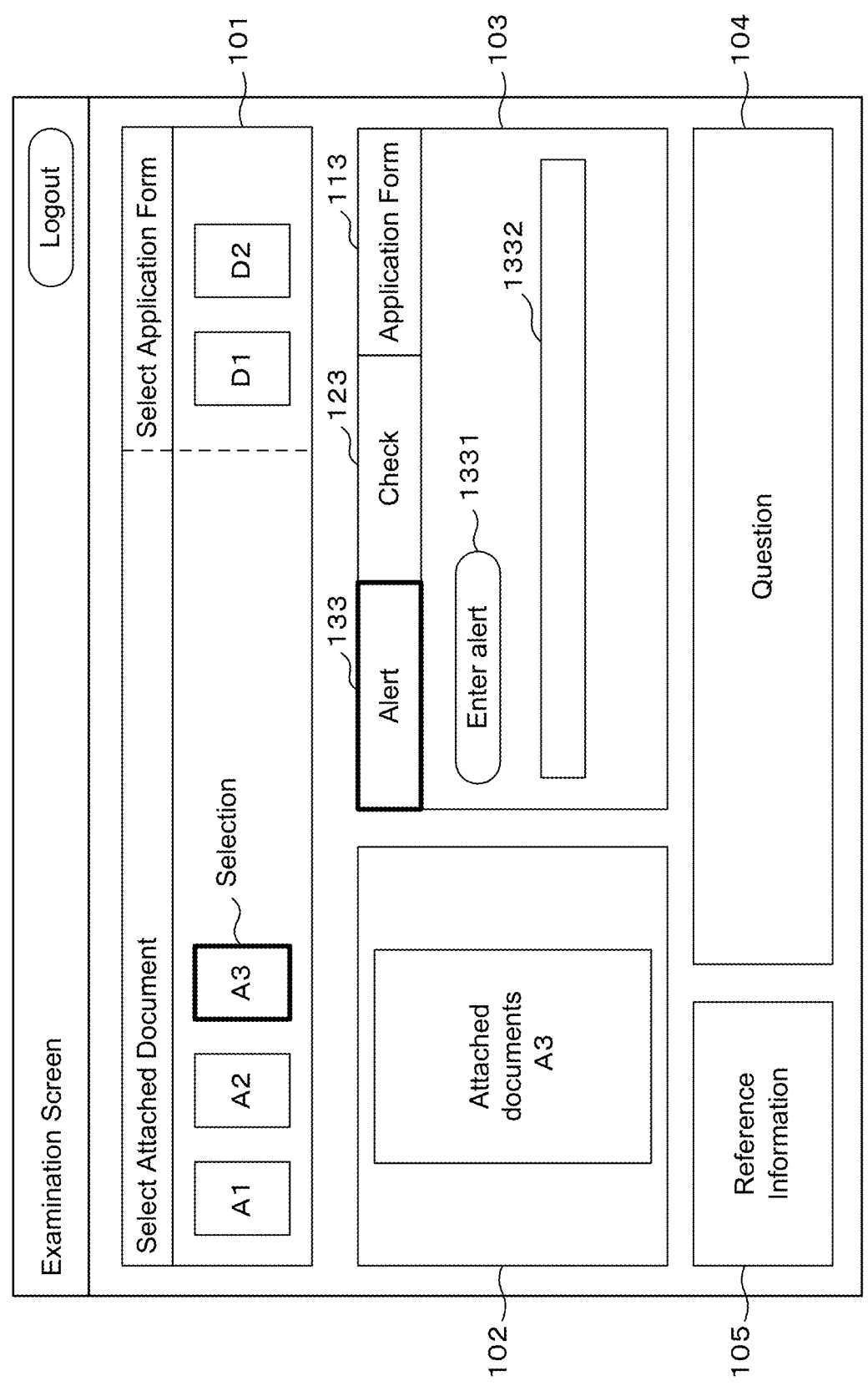
FIG. 14 illustrates a third example of the examination screen.

FIG. 13 illustrates a second example of the examination screen. It is assumed that the thumbnail A3 corresponding to the attached document in FIG. 14 is to be selected. If accepting the selection of a thumbnail, the control unit 51 displays the image of the document to be examined corresponding to the selected thumbnail in the second display area 102. In the example in FIG. 13, the image of the attached document A3 corresponding to the thumbnail A3 is being displayed. In the examination screen of the second example, the "check" tab 123 in the third display area 103 is being selected. In the third display area 103, a "place a checkmark" icon 1231 is being displayed. In the case where the user operates the "place a checkmark" icon 1231 while viewing the attached document A3 displayed in the second display area 102, a checkmark (predetermined symbol) is inserted into the attached document A3.

FIG. 14 illustrates a third example of the examination screen. In the third examination screen, the "alert" tab 133 in the third display area 103 is being selected. In the third display area 103, an "enter alert" icon 1331 and an alert (comment) entry field 1332 are displayed. In the case where the user operates the "enter alert" icon 1331 to enter a comment in the entry field 1332 while viewing the attached document A3 displayed in the second display area 102, a comment is inserted into the attached document A3.

Figure 15:
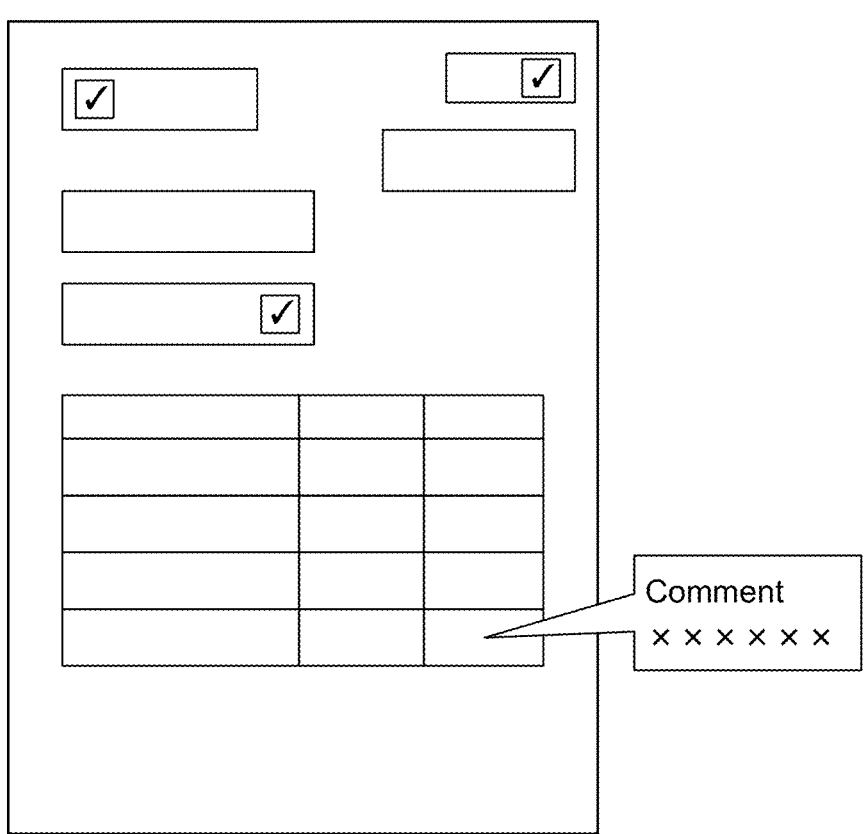
FIG. 15 illustrates one example of the insertion of a comment and a predetermined sign to an attached document.

FIG. 15 illustrates an example of insertion of a comment and a predetermined sign to an attached document. In the example in FIG. 15, checkmarks are placed at three locations. For example, in the middle of the examination of a document to be examined, the user places a checkmark relative to the examined examination item to clarify the examined location and avoids needless work such as duplicate checking of the same examination item. In addition, in the example in FIG. 15, a comment is placed relative to a specific examination item. By placing a comment, the details of a deficient entry, for example, can be described for the relevant examination item. Such a comment is useful information when the user sends the documents to be examined back to the applicant or when the approver sends the documents to be examined back to the user, which enables efficient modification of the deficient entry. The checkmarks indicated in FIG. 15 correspond to checks made by visual inspection of the attached document. Since an automatic judgment function is not prepared for attached documents, the checkmarks can be used for creating a history of checks at the manual confirmation, and can be used as information indicating that the attached documents have been confirmed by the user in the examination phase by the approver, for example.

As described above, in the case where an editing operation on the examination result displayed in the third display area 103 is accepted, or in the case where checkmarks are placed and a comment is entered as illustrated in FIG. 15, the control unit 51 stores (saves) the results of editing and entry by a "memory" icon (not illustrated) being operated.

Setting (registering) of questions to be displayed in the fourth display area 104 is now described. The questions are set by the user according to the examination points to prevent the user from failing to confirm the points.

The control unit 51 may accept the registration of a primary question (first question) to be displayed in the fourth display area 104, accept the setting of the presence or absence of a conditional branch for the question and accept the registration of a secondary question (second question) if a conditional branch is present.

FIG. 16 illustrates one example of a question setting screen. On the question setting screen, for each application category (for each of the procedures related to child-rearing, nursing care, disaster victim support and car ownership, for example), each question for the first question, the conditional branch ("present" or "absent") for the first question, the answer to the first question ("YES" or "NO") when the conditional branch is "present," and the second question required depending on the answer can be set and registered. By operating the "–" icon, a question can be deleted. By operating the "+" icon, a conditional branch or a question can be added. Specifically, the first question with no conditional branch corresponds to "Please confirm that there are no omissions in the application form" or "Please confirm that personal identification documents are attached." Meanwhile, in the case where the first question with a conditional branch corresponds to "Is the age of the applicant 18 years or older," the second question can be set as "Please confirm that the applicant is 18 years or older on the personal identification document" if the answer to the first question is "YES," while the second question can be set as "Please confirm that a parental consent form is attached" if the answer to the first question is "NO." The control unit 51 can register the setting information of the questions as illustrated in FIG. 16 in the question DB 61.

The setting of examination rules is now described. The examination rule is the settings of examination items to be checked automatically, and the third display area 103 described above is subjected to automatic examination.

FIG. 17 illustrates one example of an examination rule setting screen. On the examination rule setting screen, for each application category (for each of the procedures related to child-rearing, nursing care, disaster victim support and car ownership, for example), an examination rule can be set. The examination rule can be set by the columns of the attached documents/administrative core computer system necessary for examining an application form, the examination item, the examination type and the examination requirements. In the attached documents or administrative core computer system column, documents and information necessary for the examination can be set, including the attached document A1, the attached document A2, and OO information for XX system. In the examination item column, the contents to be examined including the name, age and individual number can be set. In the examination type column, checking whether to match an application form or not, or whether to meet a condition or not can be set. If the condition matching is set as the examination type, the condition can be set. By operating the "–" icon, rule can be deleted. By operating the "+" icon, an examination requirements or rule can be added. The control unit 51 can register the setting information of the examination rule as illustrated in FIG. 17 in the examination rule DB 62. The examination rule setting screen can be freely designed. In other words, the settings of the examination rule setting screen can be defined by the user (e.g., a person in charge at the municipal office) at his or her discretion for each procedure. In addition, examination rules may also be provided to business operations, to thereby accumulate history information such as examination results, update the examination rules as necessary, delete some of the examination rules or add new examination rules.

As described above, for each examination item, specifying information for specifying a document to be examined as a target to be compared out of multiple documents to be examined (information set to the attached documents or administrative core computer system column in the example in FIG. 17) and an examination rule (examination rule information) including the examination requirements for the examination item may be stored in the examination rule DB 62. The control unit 51 can examine the examination item of the documents to be examined based on the examination rule DB 62.

In addition, the control unit 51 may obtain a true value for an examination item from the administrative core computer system 80 including the core computer system and examine an examination item of the documents to be examined using the obtained true value. The true value includes the individual information of the applicant for a procedure (e.g., the information on the driver's license, health insurance card, nursing care insurance card, certificate of residence, certified of family register, certificate of registered seal).

Figure 18:
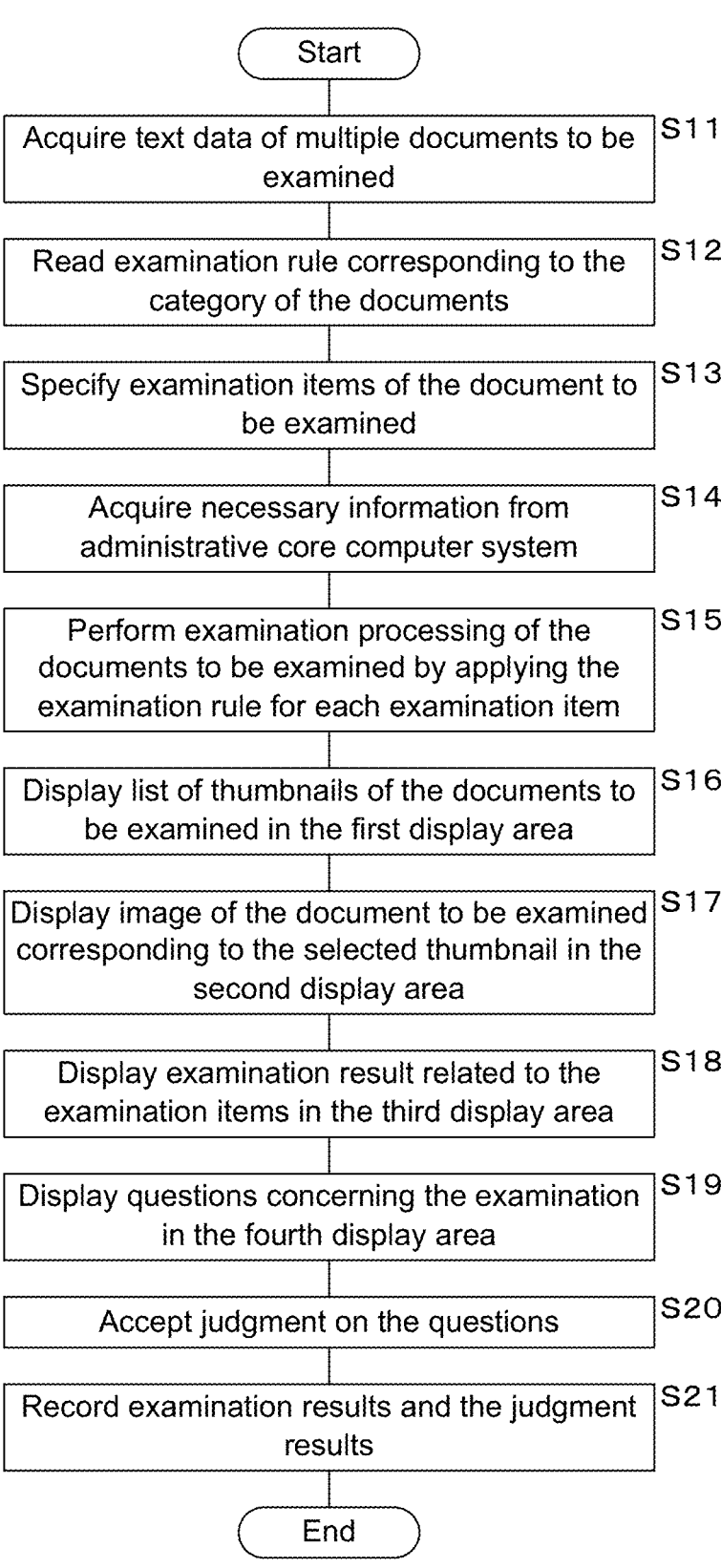
FIG. 18 illustrates an example of a processing procedure performed by an information processing apparatus.

FIG. 18 illustrates an example of a processing procedure to be performed by the information processing apparatus 50. For the sake of convenience, the following describes the control unit 51 as the subject of the processing. The control unit 51 acquires text data of multiple documents to be examined (S11). Here, already-converted text data may be obtained or image data may be obtained and then character-recognized through OCR processing before converted into text data. The control unit 51 reads the examination rule corresponding to the category of the documents to be examined from the examination rule DB 62 (S12). The category of the documents to be examined may be obtained by recognizing the letters "application for XXX" written in a predetermined location of the application form, for example.

The control unit 51 specifies examination items of the document to be examined (S13). See FIG. 2 or FIG. 3 for the examination items. The examination items each include the position of the area to be examined where the examination item is described and the description (character string) within the area to be examined. The control unit 51 acquires necessary information (e.g., true value) from the administrative core computer system 80 according to each of the specified examination items (S14).

The control unit 51 performs examination processing of the documents to be examined by applying the examination rule for each examination item (S15). The control unit 51 displays a list of thumbnails of the documents to be examined in the first display area 101 (S16), and, if one of the thumbnails is selected, displays an image of the document to be examined corresponding to the selected thumbnail in the second display area 102 (S17).

The control unit 51 displays the examination result related to the examination items of the documents to be examined in the third display area 103 (S18) and displays the questions concerning the examination in the fourth display area 104 (S19). The control unit 51 accepts the judgment on the questions displayed in the fourth display area 104 (S20), records the examination results and the judgment results in the storage unit 55 (S21), and ends the processing.

As described above, the control unit 51 acquires text data of the multiple documents to be examined and outputs a list of information (e.g., thumbnails) of the multiple documents to be examined to the first display area 101 of the display screen. If accepting selection of any information, the control unit 51 outputs the image of the document to be examined corresponding to the selected information to the second display area 102 of the display screen, outputs an examination result related to the examination items of the multiple documents to be examined to the third display area 103 of the display screen, and outputs questions related to the examination to the fourth display area of the display screen.

Accordingly, the user is able to simultaneously confirm, on one display screen, the information separately displayed in the first display area 101, the second display area 102, the third display area 103 and the fourth display area 104, which eliminates the need for switching screens in order to display necessary information, thereby allowing the user to work effectively and efficiently.

Though in the embodiment described above, the documents to be examined in the administrative agency were mainly described, application of the present embodiment is not limited to the administrative agency. The present embodiment may be applied to various fields including financial institution and publishing industry that need to examine a large volume of documents through one-to-many comparison or many-to-many comparison.

Though the information processing apparatus 50 is configured to display (output) examination results or the like on the display screen of the terminal device 10 in the embodiment described above, the configuration is not limited thereto. For example, the terminal device 10, which is incorporated with the function of the information processing apparatus 50, may execute the processing such as the examination item specifying processing, the examination rule application processing, the display control processing (output control processing) and the like.

[Appendant Remarks]

1. An information processing apparatus comprising a control unit, wherein the control unit acquires text data of a plurality of documents to be examined; outputs a list of pieces of information of the plurality of documents to be examined in a first display area of a display screen; if accepting selectin of a piece of the information, outputs an image of at least one of the plurality of documents to be examined corresponding to a selected piece of the information, to a second display area of the display screen; outputs an examination result concerning examination items of the plurality of documents to be examined to a third display area of the display screen; and outputs a question related to examination to a fourth display area of the display screen.

2. The information processing apparatus according to clause 1, wherein the control unit outputs reference information related to the question.

3. The information processing apparatus according to clause 1 or 2, wherein the control unit accepts registration of a first question to be output to the fourth display area, accepts setting of a presence or an absence of a conditional branch for the first question, and accepts registration of a second question if the conditional branch is present.

4. The information processing apparatus according to any one of clauses 1 to 3, wherein the control unit accepts an answer to the first question, and outputs the second question depending on an accepted answer.

5. The information processing apparatus according to any one of clauses 1 to 4, wherein the control unit accepts at least one of insertion of a comment and insertion of a predetermined sign with respect to an image of a document to be examined output to the second display area.

6. The information processing apparatus according to any one of clauses 1 to 5, wherein the control unit accepts an editing operation for an examination result output to the third display area.

7. The information processing apparatus according to any one of clauses 1 to 6, wherein the control unit outputs an examination item in a different manner depending on an examination result related to the examination item output to the third display area.

8. The information processing apparatus according to any one of clauses 1 to 7, further comprising a storage unit storing examination rule information including specifying information for specifying a document to be examined that is to be compared out of the plurality of documents to be examined for each examination item and an examination requirements for the examination item, wherein the control unit examines an examination item of the documents to be examined based on the examination rule information.

9. The information processing apparatus according to any one of clauses 1 to 8, wherein the control unit acquires a true value related to the examination item from an external system including an administrative core computer system and examines an examination item of the documents to be examined using an acquired true value.

10. A computer program causing a computer to execute processing of: acquiring text data of a plurality of documents to be examined; outputting a list of pieces of information of the plurality of documents to be examined in a first display area of a display screen; if accepting selectin of a piece of the information, outputting an image of at least one of the plurality of documents to be examined corresponding to a selected piece of the information, to a second display area of the display screen; outputting an examination result concerning examination items of the plurality of documents to be examined to a third display area of the display screen; and outputting a question related to examination to a fourth display area of the display screen.

11. An information processing method comprising: acquiring text data of a plurality of documents to be examined; outputting a list of pieces of information of the plurality of documents to be examined in a first display area of a display screen; if accepting selectin of a piece of the information, outputting an image of at least one of the plurality of documents to be examined corresponding to a selected piece of the information, to a second display area of the display screen; outputting an examination result concerning examination items of the plurality of documents to be examined to a third display area of the display screen; and outputting a question related to examination to a fourth display area of the display screen.

The matters described in each embodiment can be combined with each other. In addition, independent claims and dependent claims stated in the scope of claims can be combined with each other in any combination, regardless of the citation format. In addition, the scope of claims uses the form of describing claims that depend on two or more other claims (multi-claim format), though not limited to this form. The scope of claims uses the form of describing multiple claims that depend at least one multiple claims (multi-multi claim).

It is to be noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An information processing apparatus comprising a control unit comprising processors, wherein the control unit acquires text data of a plurality of documents to be examined;

outputs a list of pieces of information of the plurality of documents to be examined in a first display area of a display screen;

when accepting selectin of a piece of the information, outputs an image of at least one of the plurality of documents to be examined corresponding to a selected piece of the information, to a second display area of the display screen;

outputs an examination result concerning examination items of the plurality of documents to be examined to a third display area of the display screen; and outputs a question related to examination to a fourth display area of the display screen, wherein the control unit accepts registration of a first question to be output to the fourth display area, accepts setting of a presence or an absence of a conditional branch for the first question, accepts registration of a second question when the conditional branch is present, accepts an answer to the first question, and outputs the second question depending on an accepted answer.

2. The information processing apparatus according to claim 1, wherein the control unit outputs reference information related to the question.

3. The information processing apparatus according to claim 1, wherein the control unit accepts at least one of insertion of a comment and insertion of a predetermined sign with respect to an image of a document to be examined output to the second display area.

4. The information processing apparatus according to claim 1, wherein the control unit accepts an editing operation for an examination result output to the third display area.

5. The information processing apparatus according to claim 1, wherein the control unit outputs an examination item in a different manner depending on an examination result related to the examination item output to the third display area.

6. The information processing apparatus according to claim 1, further comprising a storage unit storing examination rule information including specifying information for specifying a document to be examined that is to be compared out of the plurality of documents to be examined for each examination item and an examination requirements for the examination item, wherein the control unit examines an examination item of the documents to be examined based on the examination rule information.

7. The information processing apparatus according to claim 1, wherein the control unit acquires a true value related to the examination item from an external system including an administrative core computer system and examines an examination item of the documents to be examined using an acquired true value.

8. A computer readable non-transitory recording medium recording a computer program causing a computer to execute processing of:

acquiring text data of a plurality of documents to be examined;

outputting a list of pieces of information of the plurality of documents to be examined in a first display area of a display screen;

when accepting selectin of a piece of the information, outputting an image of at least one of the plurality of documents to be examined corresponding to a selected piece of the information, to a second display area of the display screen;

outputting an examination result concerning examination items of the plurality of documents to be examined to a third display area of the display screen; and outputting a question related to examination to a fourth display area of the display screen, wherein the control unit accepts registration of a first question to be output to the fourth display area, accepts setting of a presence or an absence of a conditional branch for the first question, accepts registration of a second question when the conditional branch is present, accepts an answer to the first question, and outputs the second question depending on an accepted answer.

9. An information processing method, comprising:

acquiring text data of a plurality of documents to be examined;

outputting a list of pieces of information of the plurality of documents to be examined in a first display area of a display screen;

when accepting selectin of a piece of the information, outputting an image of at least one of the plurality of documents to be examined corresponding to a selected piece of the information, to a second display area of the display screen;

outputting an examination result concerning examination items of the plurality of documents to be examined to a third display area of the display screen; and outputting a question related to examination to a fourth display area of the display screen, wherein the control unit accepts registration of a first question to be output to the fourth display area, accepts setting of a presence or an absence of a conditional branch for the first question, accepts registration of a second question when the conditional branch is present, accepts an answer to the first question, and outputs the second question depending on an accepted answer.

* * * * *